United States Patent [19]
Ackermann et al.

[11] Patent Number: 6,147,427
[45] Date of Patent: Nov. 14, 2000

[54] ELECTROMOTIVE ADJUSTABLE DRIVE

[75] Inventors: Bernd Ackermann, Aachen, Germany; Martin Houkes, Brunssum, Netherlands

[73] Assignee: U.S. Philips Corporation, New York, N.Y.

[21] Appl. No.: 09/297,723
[22] PCT Filed: Aug. 31, 1998
[86] PCT No.: PCT/IB98/01361
  § 371 Date: Jun. 28, 1999
  § 102(e) Date: Jun. 28, 1999
[87] PCT Pub. No.: WO99/13557
  PCT Pub. Date: Mar. 18, 1999

[30] Foreign Application Priority Data
  Sep. 8, 1997 [DE] Germany .................. 197 39 068

[51] Int. Cl.$^7$ .................. H02K 26/00; H02K 41/035; E05B 47/00
[52] U.S. Cl. .................. 310/154; 310/36; 310/181; 310/49 R; 310/254; 335/266
[58] Field of Search .................. 310/154, 155, 310/180, 181, 36, 254, 49 R; 335/266; 324/144, 146, 151 R

[56] References Cited

U.S. PATENT DOCUMENTS

| 3,434,082 | 3/1969 | Montagu | 335/229 |
|---|---|---|---|
| 3,891,922 | 6/1975 | Atzinger | 324/151 R |
| 4,462,014 | 7/1984 | Montagu | 335/230 |
| 4,845,424 | 7/1989 | Gamble | 324/146 |
| 5,243,241 | 9/1993 | Wang | 310/36 |

FOREIGN PATENT DOCUMENTS

| 19606836 | 8/1996 | Germany | F02D 41/08 |

OTHER PUBLICATIONS

"Performance Prediction of Laws's Relay Actuator", by H.R. Bolton et al, IEE Proceedings, vol. 137, PT. B., No. 1, Jan. 1990.

Primary Examiner—Burton Mullins
Attorney, Agent, or Firm—Tony E. Piotrowski

[57] ABSTRACT

An electromotive actuating device having a movable member and a stationary member is disclosed. The device includes a first excitation part adapted to generate a constant magnetic flux and a second excitation part adapted to generate a magnetic flux of variable amplitude, a first and a second magnetic circuit is provided for guiding the magnetic flux generated by the first excitation part. The reluctance of the first and of the second magnetic circuit is controlled by means of the position of the movable member, and the second excitation part being included in the second magnetic circuit. An actuating device of this type has a rotary actuator having a range of more than 90°. This is achieved in that the stationary member includes at least a first pole shoe, a second pole shoe and a third pole shoe. The first pole shoe and the third pole shoe form flux guiding elements of the first magnetic circuit. The second pole shoe and the third pole shoe form flux guiding elements of the second magnetic circuit.

17 Claims, 7 Drawing Sheets

ELECTROMOTIVE ADJUSTABLE DRIVE

FIELD OF THE INVENTION

The invention relates to an electromotive actuating device having a movable member and a stationary member comprising at least a first excitation part adapted to generate a magnetic flux, particularly a constant magnetic flux, and at least a second excitation part adapted to generate a magnetic flux of variable amplitude, at least a first and a second magnetic circuit being provided for guiding the magnetic flux generated by the first excitation part, the reluctance of the first and of the second magnetic circuit being controllable by means of the position of the movable member, and the second excitation part being included in the second magnetic circuit.

DESCRIPTION OF PRIOR ART

An electromotive actuating device of the type defined in the opening paragraph is known from the article "Performance Prediction of Laws Relay Actuator", IEE Proceedings, Vol. 137, Pt. B, No. 1, January 1990, pp. 1 to 13, by H. R. Bolton and Y. Shakweh. This known electromotive actuating device is also referred to as a Laws relay and comprises as movable member a soft-magnetic rotor having two rotor pole shoes and as stationary member a stator having four stator pole shoes arranged symmetrically along the circumference. The stator comprises two permanent magnets which generate a constant magnetic flux, as well as two excitation coils by means of which a magnetic flux of variable amplitude can be generated. The four stator pole shoes and the two rotor pole shoes of this known electromotive actuating device have the same circumferential angle. The maximal angle of movement of this electromotive actuating device is as large as the circumferential angle of the stator and rotor pole shoes. The maximum range of movement of this actuating device is limited to values below 90° because both the permanent magnets and the excitation coils require space at the circumference of the air gap.

SUMMARY OF THE INVENTION

It is an object of the invention to provide an electromotive actuating device of the type defined in the opening paragraph by means of which a rotary actuator having a range of movement of more than 90° can be realized.

According to the invention this object is achieved in that the stationary member comprises at least a first pole shoe, a second pole shoe and a third pole shoe, in that the first pole shoe and the third pole shoe form flux guiding elements of the first magnetic circuit, and in that the second pole shoe and the third pole shoe form flux guiding elements of the second magnetic circuit.

The first excitation part is disposed both in the first and in the second magnetic circuit, as a result of which the magnetic flux generated by the first excitation part, which is preferably constant, can be linked via the first and/or the second magnetic circuit. The second excitation part is disposed in the second magnetic circuit only. It is preferably constructed as a an excitation coil, enabling a magnetic flux of variable amplitude to be obtained by variation of the excitation current. The movable member, which is preferably soft-magnetic, is arranged both in the first and in the second magnetic circuit in such a manner that the resistance of the first and of the second magnetic circuit varies in dependence on the position of the movable member. Preferably, the movable member and the stationary member are constructed in such a manner that during movement of the movable member the resistance of the first magnetic circuit and the resistance of the second magnetic circuit vary oppositely, i.e. during a movement of the movable member in a first direction the resistance of the first magnetic circuit increases and the resistance of the second magnetic circuit decreases and during a rotation of the movable member in the opposite second direction the resistance of the first magnetic circuit decreases and the resistance of the second magnetic circuit increases. The electromotive actuating device in accordance with the invention has at least three pole shoes, of which the first pole shoe is arranged in the first magnetic circuit, of which the second pole shoe is arranged in the second magnetic circuit, and of which the third pole shoe is arranged in both magnetic circuits, i.e. both in the first magnetic circuit and in the second magnetic circuit. The third pole shoe is thus used as a flux-guiding element in both magnetic circuits. The actuating device can therefore be realized by means of three pole shoes of the stationary member. Particularly in the case of a rotary actuating device, this has the advantage that angular movement ranges of more than 90° can be realized. In the case of a symmetrical arrangement of the three pole shoes of the stationary member circumferential angles of approximately 120° are available in the case of a rotary actuating device. Thus, it is also possible to realize a range of movement of more than 90° when the circumferential angles required for the first and the second excitation part are applied.

An advantage embodiment of the invention has the characteristic features defined in claim 2. This advantage embodiment of the invention enables the attainable torque of the actuating device to be increased. Preferably, the magnetic flux generated by the third excitation part is exactly equal to the magnetic flux generated by the first excitation part. As a result of this, the torque of the electromotive actuating device can be doubled. In a first maximum position of the movable member the magnetic flux generated by the third excitation part is guided essentially via the fourth magnetic circuit and the magnetic flux generated by the first excitation part is guided essentially via the first magnetic circuit. The magnetic flux generated by the third excitation part is therefore linked strongly to the second excitation part, while the magnetic flux generated by the first excitation part is not or only weakly linked to the second excitation part. In the opposite maximum position the magnetic flux generated by the first excitation part is guided essentially via the second magnetic circuit and the magnetic flux generated by the third excitation part is guided essentially via the third magnetic circuit. In this opposite second maximum position the magnetic flux generated by the first excitation part therefore links to the second excitation part, while the magnetic flux generated by the third excitation part hardly links to the second excitation part.

The embodiment of the electromotive actuating device as defined in claim 3 has the advantage that the permanent magnets can be mounted in slots or grooves in the stationary member in a manner which is favorable for reasons of production engineering. The permanent magnets can be rectangular blocks, which can be manufactured at very low cost. Since the permanent magnets are arranged on the stationary member the stationary member can be extended towards the outside at the location of the permanent magnets in order to enable flux focusing. This is particularly favorable in the advantage embodiment of the actuating device as defined in claim 6. Ferrite magnets are cheaper than, for example, NdFeB magnets but they have a smaller magnetic flux density and therefore require more volume.

The advantage embodiment of the device as defined in claim 3 further has the feature that the magnetic flux generated by the second excitation part is essentially returned to the first excitation part via the first pole shoe, the movable member and the second pole shoe. Hardly any magnetic flux generated by the second excitation part passes through the third pole shoe. This means that the reluctance torque is essentially defined by the air gap geometry of the air gap between the first pole shoe and the movable member and the second pole shoe and the movable member. The air gap between the third pole shoe and the movable member has only a very small influence on the reluctance torque. This makes it possible to minimize or eliminate the reluctance torque by a suitable design of the air gap between the movable member and the first and the second pole shoe and to minimize or eliminate the detent torque by a suitable design of the air gap between the stationary member and the third pole shoe. This results in an electromotive actuating device whose overall torque is substantially free from detent torque and reluctance torque but consists only of a hybrid torque which is substantially constant over the whole range of movement of the rotor. The hybrid torque is produced by the cooperation of the magnetic flux generated by the first and the third excitation part, the magnetic flux generated by the second excitation part and the linkage of these individual magnetic fluxes to the excitation coil of the second excitation part.

However, by a suitable design of the surface geometry of the pole shoes of the stationary member and the geometry of the movable member alternative torque characteristics can be achieved. Particularly, it is possible to use asymmetrical air gap geometries in order to adapt the torque characteristics to widely varying requirements. Particularly, it is possible to realize a magnetic restoring torque which causes the movable member to move into a well-defined rest position when the second excitation part is not energized. Likewise, two or more rest positions can be realized, which of these rest position is assumed by the movable member being dependent on the position and the speed of the movable member when the second excitation part is deenergized.

The embodiment as defined in claim 5 has the advantage that the maximum range of the actuating device can also be extended to values of >120°. The maximum range of movement is essentially determined by the circumferential angle of the first and of the second pole shoe of the stationary member. The maximum possible range is extended according as the circumferential angle of the third pole shoe is reduced in favor of the circumferential angle of the first pole shoe and of the second pole shoe.

In an advantageous embodiment of the invention the actuating drive can take the form of a linear actuator. Such a linear actuator is particularly suitable for the actuation of a door locking mechanism. If the actuating device in accordance with the invention takes the form of a rotary actuator it can be used advantageously for the actuation of a throttle valve arranged in a conduit of a combustion engine, for controlling a gas or liquid flow.

BRIEF DESCRIPTION OF THE DRAWINGS

Some diagrammatically shown embodiments of the invention will be described in more detail, by way of example, with reference to FIGS. 1 to 9 of the drawings. In the drawings.

DETAILED DESCRIPTION OF THE PREFERRED EMBODIMENTS

Figure 1:
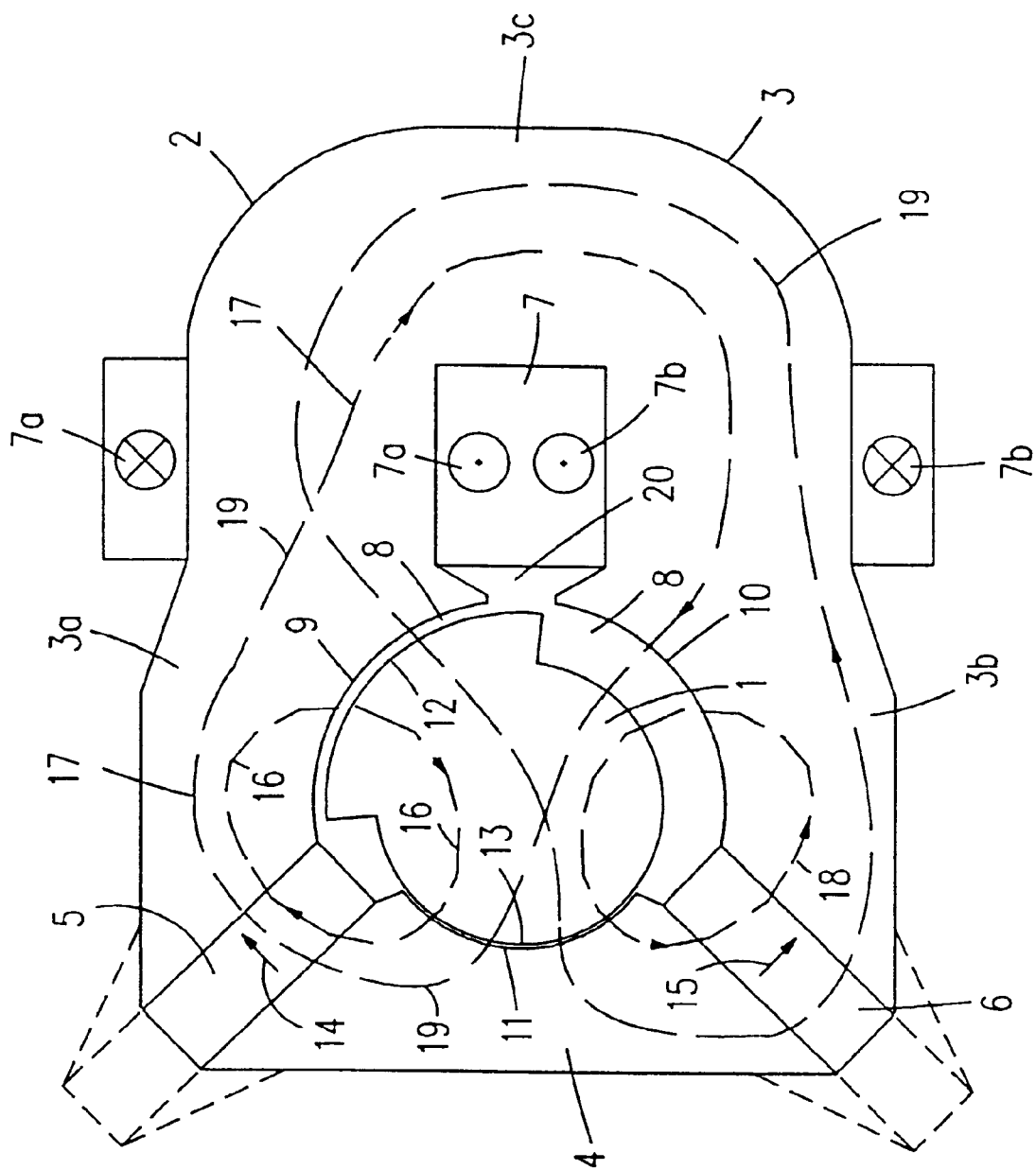
FIG. 1 shows an electromotive actuating device in the form of a rotary actuator comprising a soft-magnetic rotor and a stationary stator having three pole shoes, two permanent magnets and two excitation coils, the soft-magnetic rotor being in a first maximum position.

FIG. 1 shows an electromotive actuating device in the form of a rotary actuator. This electromotive actuating device comprises as movable member a soft-magnetic rotor 1 and as stationary member a stator 2. The stator 2 has a first soft-magnetic iron yoke 3 and a second soft-magnetic iron yoke 4. The first soft-magnetic iron yoke 3 is U-shaped. It comprises a first limb 3a, a second limb 3b and a coupling portion 3c. The end of the first limb 3a carries a first permanent magnet 5 as a first excitation part and the end of the second limb 3b carries a second permanent magnet 6 as a third excitation part. The first permanent magnet 5 and the second permanent magnet 6 are block-shaped. As a result of this, they can be manufactured in a favorable manner from the point of view of production engineering. The first permanent magnet 5 and the second permanent magnet 6 are connected to one another by means of the second iron yoke 4, as a result of which the first permanent magnet 5, the first iron yoke 3, the second permanent magnet 6 and the second iron yoke 4 form a closed magnetic circuit. The stator 2 has a stator coil 7 as second excitation part, which coil comprises a first stator winding 7a and a second stator winding 7b. The stator coil 7 is accommodated in a groove 20 in the first soft-magnetic iron yoke 3. The rotor 1 is disposed inside the stator 2 and is spaced from the stator 2 by an air gap 8. The permanent magnets 5 and 6 can take the form of ferrite magnets or of NdFeB magnets. Since ferrite magnets generate a smaller magnetic flux density it may be required to prolong the permanent magnets 5 and 6 in the manner shown in broken lines in FIG. 1. It is then likewise advantageous to extend the stator 2 at the locations of the permanent magnets 5 and 6 in the manner shown in broken lines in FIG. 1, in order to achieve flux focusing. The first limb 3a of the first iron yoke 3 has a first pole shoe 9, the second limb 3b of the first iron yoke 3 has a second pole shoe 10, and the second iron yoke 4 has a third pole shoe 11. The rotor 1 has a first rotor pole shoe 12 and a second rotor pole shoe 13, the first rotor pole shoe 12 serving for cooperation with the first stator pole shoe 9 and the second stator pole shoe 10 and the second rotor pole shoe 13 serving for cooperation with the third stator pole shoe 11. The first permanent magnet 6 generates a first constant magnetic flux 14, which is directed towards the first iron yoke 3, and the second permanent magnet 6 generates a second constant magnetic flux 15, which is also directed towards the first iron yoke 3. A first magnetic circuit 16 and a second magnetic circuit 17 have been provided essentially in order to guide the first magnetic flux 14 generated by the first permanent magnet 5. The first magnetic circuit 16 extends from the first permanent magnet 5 to the first permanent magnet 5 via the limb 3*a* of the first iron yoke 3, the first stator pole shoe 9, the rotor 1, the third stator pole shoe 11 and the second iron yoke 4. The second magnetic circuit 17 includes the first permanent magnet 5, the first limb 3*a* of the first iron yoke 3, the coupling portion 4*c*, the stator coil 7, the second limb 3*b*, the second stator pole shoe 10, the rotor 1, the third stator pole shoe 11 and the second iron yoke 4. A third magnetic circuit 18 and a fourth magnetic circuit 19 have been provided in order to guide the second magnetic flux 15 generated by the second permanent magnet 6. The third magnetic circuit 18 includes the second permanent magnet 6, the second limb 3*b* of the first iron yoke 3, the second stator pole shoe 10, the rotor 1, the third stator pole shoe 11 and the second iron yoke 4. The fourth magnetic circuit 19 includes the second permanent magnet 6, the second limb 3*b* of the first iron yoke 3, the coupling portion 3*c*, the stator coil 7, the first limb 3*a*, the first stator pole shoe 9, the rotor 1, the third stator pole shoe 11 and the second iron yoke 4. The reluctances of the magnetic circuits 16 to 19 are dependent on the instantaneous rotor position. FIG. 1 shows the rotor 1 in the first maximum position, in which the first rotor pole shoe 12 faces the first stator pole shoe 9. In this first maximum position the reluctance of the first magnetic circuit 16 and the fourth magnetic circuit 19 is comparatively low, while the reluctance of the second magnetic circuit 17 and of the third magnetic circuit 18 is comparatively high. As a result of this, the first magnetic flux 14 generated by the first permanent magnet 5 is essentially in the first magnetic circuit 16 and the second magnetic flux 15 generated by the second permanent magnet 6 is guided essentially in the fourth magnetic circuit 19. As a result of this, the first magnetic flux 14 hardly links to the stator coil 7, while the second magnetic flux 15 links almost wholly to the stator coil 7.

Figure 2:
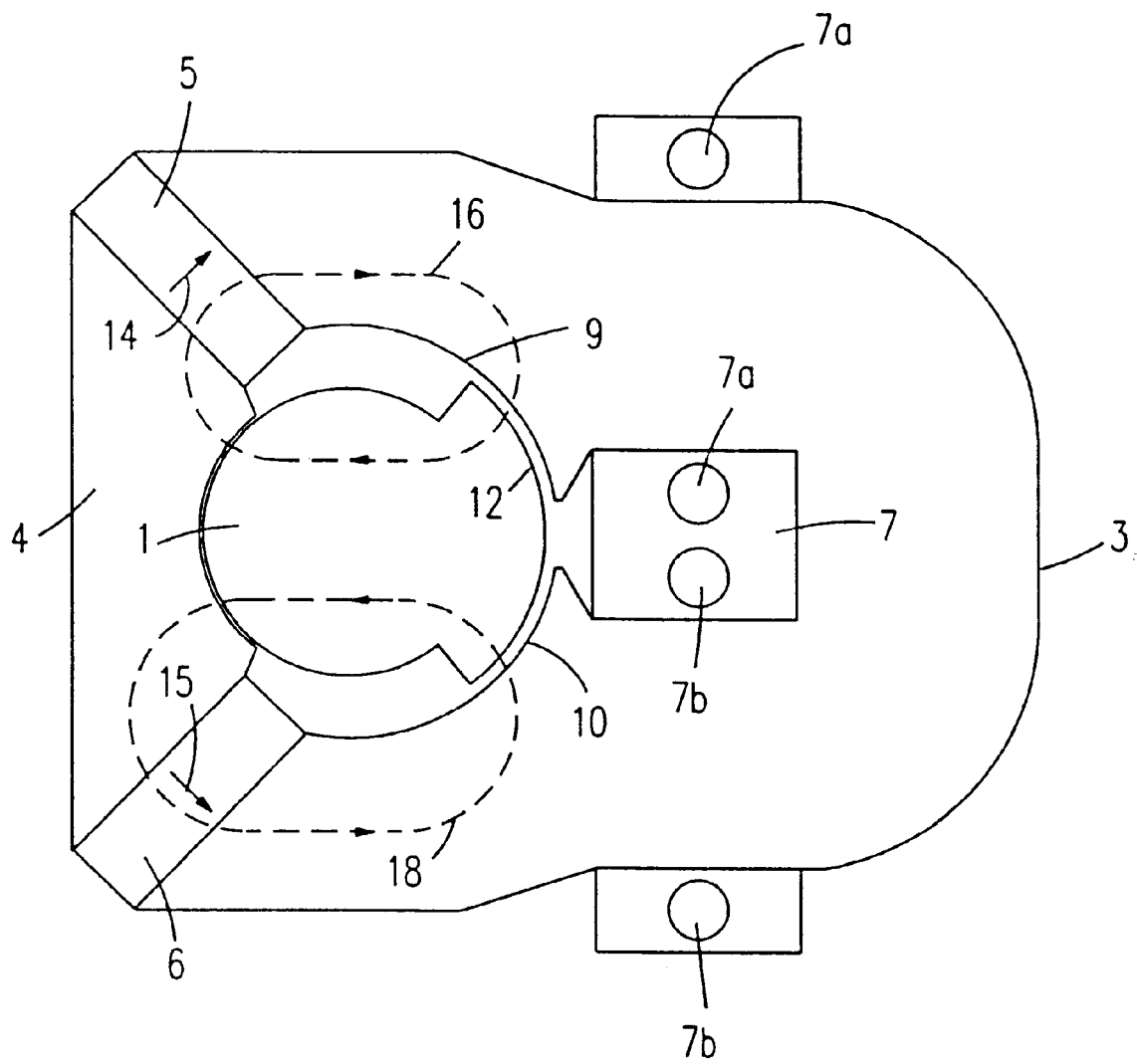
FIG. 2 shows the electromotive actuating device of FIG. 1, the rotor being shown in a center position.

The stator coil 7 is energized with an excitation current by means of a device, not shown. This excitation current can be controlled as regards its amplitude and its direction, thereby also enabling the magnetic flux generated by the stator coil to be changed in amplitude and direction. The angular position of the rotor 1 can be controlled by controlling the excitation current of the stator coil 7. In the first maximum position shown in FIG. 1 the direction and amplitude of the stator current are controlled in such a manner that an equilibrium between driving torque and restoring torque is obtained. FIG. 2 shows the and of FIG. 1 with the stator in a center position. In this center position the excitation current of the stator coil 7 is cut off, as a result of which the first rotor pole shoe 12 is aligned symmetrically with respect to the first stator pole shoe 9 and the second stator pole shoe 10. The first magnetic flux 14 generated by the first permanent magnet 5 is essentially guided in the first magnetic circuit 16 and the second magnetic flux 15 generated by the second permanent magnet 6 is essentially guided in the third magnetic circuit 18.

Figure 3:
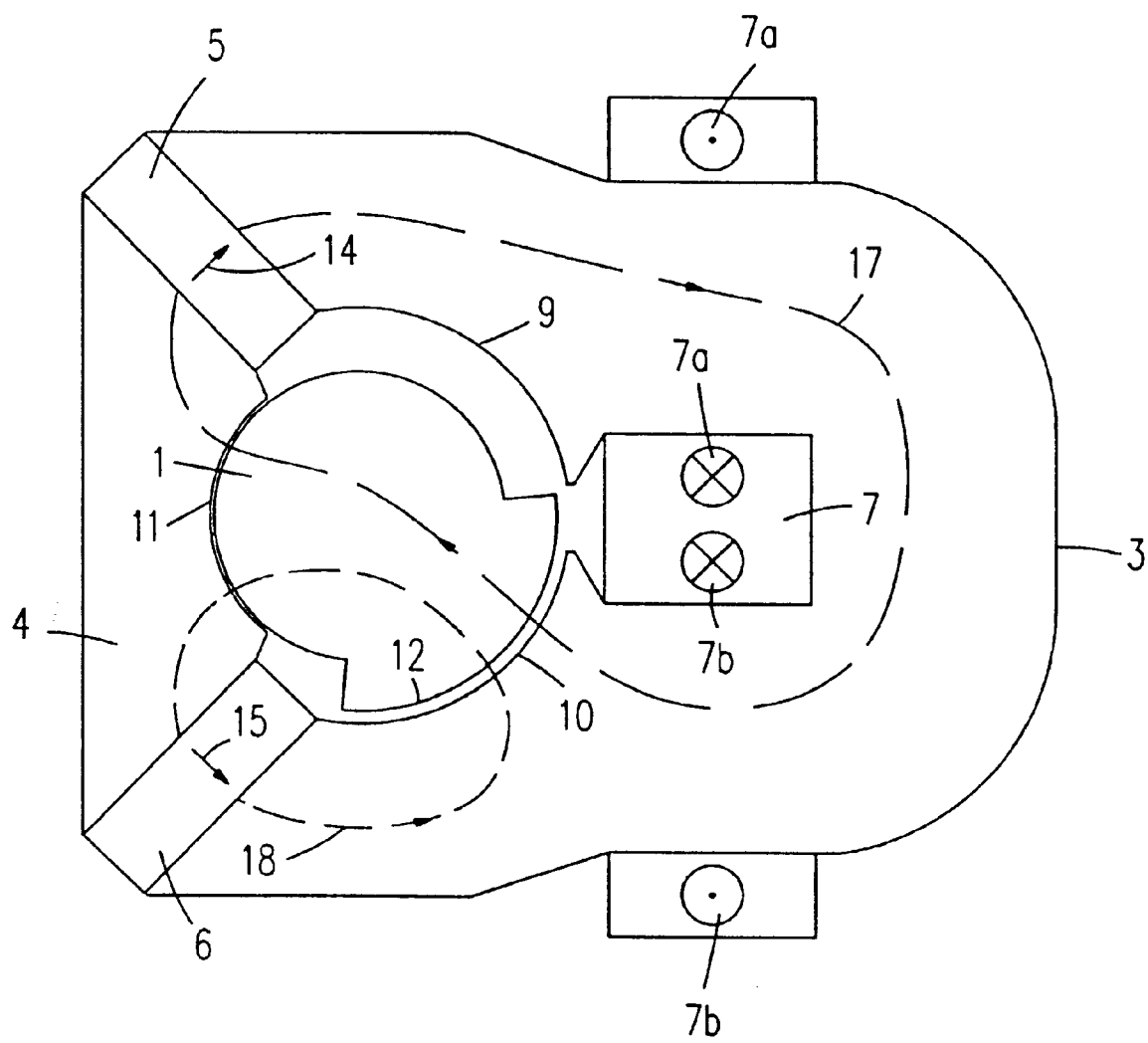
FIG. 3 shows the actuating device of FIG. 1, the rotor being shown in a second maximum position.

FIG. 3 shows the electromotive actuating device of FIG. 1 in a second maximum position. In this second maximum position the stator coil 7 carries an excitation current whose direction is opposite to that of the excitation current in the first maximum position shown in FIG. 1. The second maximum position is spaced at approximately 95° from the first maximum position shown in FIG. 1 in a clockwise direction. In this second maximum position the first rotor pole shoe 12 faces the second stator pole shoe 10. In this second maximum position the reluctance of the first magnetic circuit 16 and of the fourth magnetic circuit 19 is comparatively high, while the reluctance of the second magnetic circuit 17 and of the third magnetic circuit 18 is comparatively low. As a result of this, the first magnetic flux 14 generated by the first permanent magnet 5 is essentially guided in the second magnetic circuit 17 and the second magnetic flux 15 generated by the second permanent magnet 6 is essentially guided in the third magnetic circuit 18. Thus, the first magnetic flux 14 links almost completely to the stator coil 7, while the second magnetic flux 15 hardly links to the stator coil 7.

Figure 4:
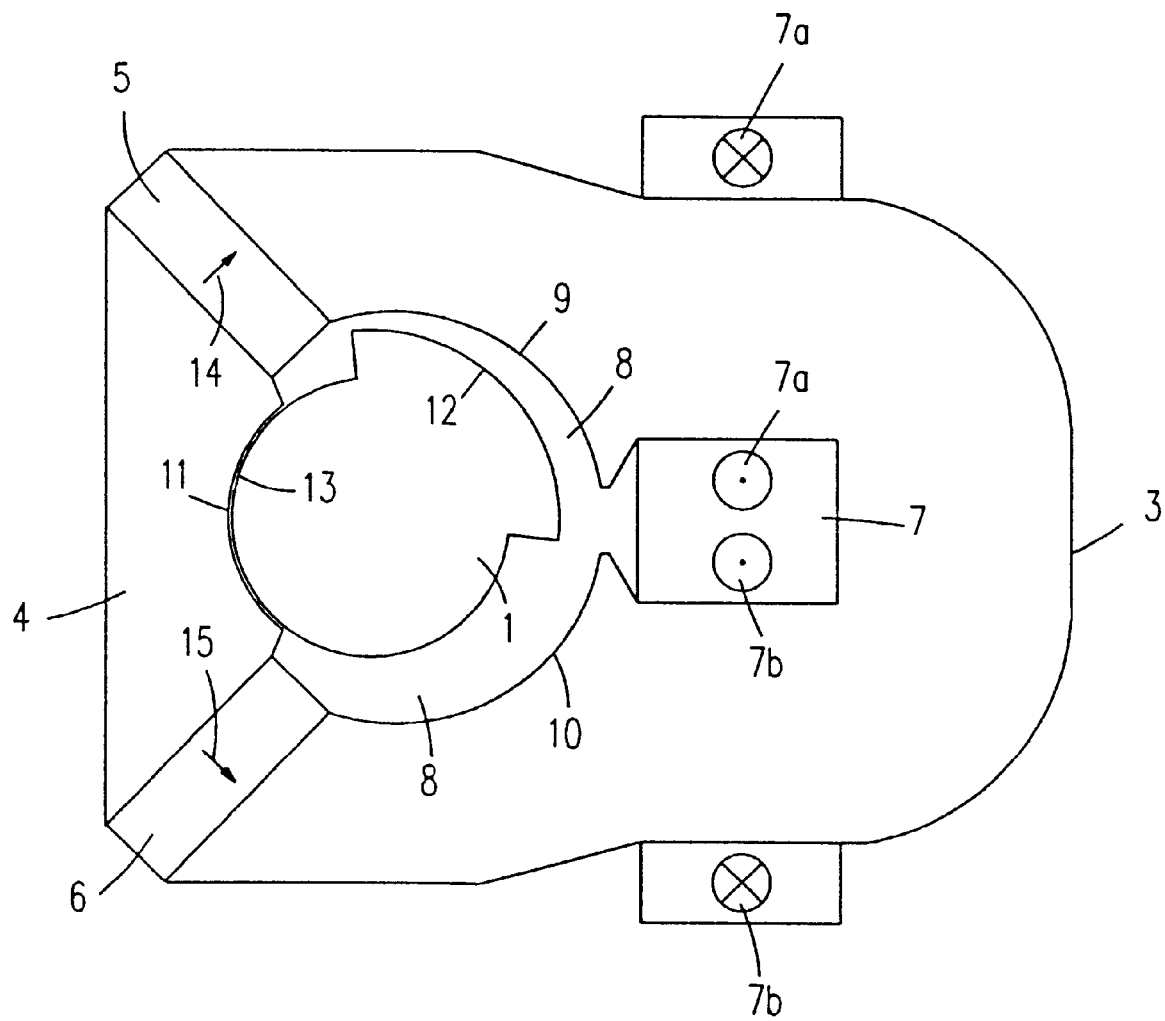
FIG. 4 shows a modification of the electromotive actuating device of FIG. 1, the air gap between the rotor and a first pole shoe and a second pole shoe of the stator being given an irregular shape in order to minimize the reluctance torque.

FIG. 4 shows an electromotive actuating device in accordance with FIG. 1, in which device the width of the air gap 8 between the first rotor pole shoe 12 and the first and the second stator pole shoe 9 and 10, respectively, varies along the circumferential angle of the first stator pole shoe 9 and the second stator pole shoe 10. The first stator pole shoe 9 and the second stator pole shoe 10 no longer have a constant radius. The distance between the first stator pole shoe 9 and the center of the rotor 1 decreases continuously towards the first permanent magnet 5 in a counter-clockwise direction. Likewise, the distance between the second stator pole shoe 10 and the center of the rotor 1 decreases continuously towards the second permanent magnet 6 in a counter-clockwise direction. The reluctance torque produced by the cooperation between the stator 2, the rotor 1 and the magnetic flux generated by the stator coil 7 is thus compensated for.

The second iron yoke 4 essentially guides only the first magnetic flux 14 generated by the first permanent magnet 5 and the second magnetic flux 15 generated by the second permanent magnet 6. Since the permanent magnets 5 and 6 present a high reluctance to the magnetic flux generated by the stator coil 7 the second iron yoke 4 hardly guides any magnetic flux generated by the stator coil 7. As a result, the reluctance torque is determined almost exclusively by the air gap between the first stator pole shoe 9 or the second stator pole shoe 10 and then first rotor pole shoe 12.

Figure 5:
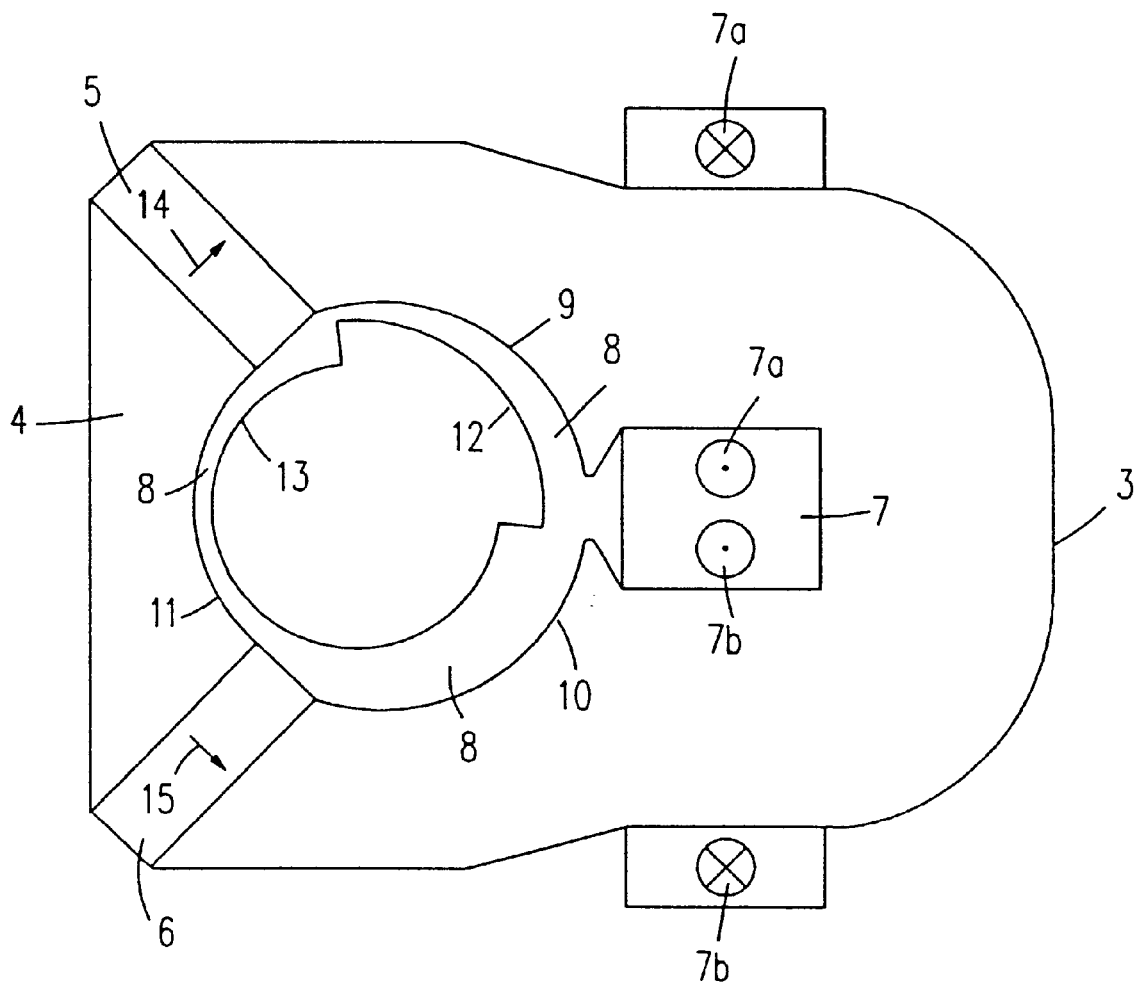
FIG. 5 shows an advantageous embodiment of the electromotive actuating device of FIG. 4, the air gap between the rotor and the third stator pole shoe being given an irregular shape in order to minimize the detent torque.

In the arrangement shown in FIG. 5 this property is utilized to provide an electromotive actuating device in which both the detent torque and the reluctance torque are eliminated.

The first stator pole shoe 9, the second stator pole shoe 10 and the first rotor pole shoe 12 in the electromotive actuating device shown in FIG. 5 are identical to those in the arrangement described with reference to FIG. 4. As a result of the asymmetrical shape of the air gap 8 between the first rotor pole shoe 12 and the first and the second stator pole shoe 9 and 10, respectively, an additional detent torque is produced, which torque results from the interaction between the first permanent magnet 5, the second permanent magnet 6 and the soft-magnetic components of the actuating device. In the arrangement shown in FIG. 5 this detent torque is compensated for by an appropriate shape of the air gap 8 between the third stator pole shoe 11 and the second pole shoe 13. Owing to this compensation for the detent torque by means of the design of the air gap 8 between the third stator pole shoe 11 and the second rotor pole shoe 13 no additional reluctance torque is produced because, as already described, the magnetic flux generated by the stator coil essentially does not pass from the third stator pole shoe 11 to the second rotor pole shoe 13 via the air gap 8.

Thus, the overall torque of the electromotive actuating device shown in FIG. 5 consists almost only of the hybrid torque desired for positioning purposes. Both the detent torque and the reluctance torque have been compensated to a substantial extent. For a more specific adaptation of the torque to the requirements of a special application it may be useful to provide a special geometry for the surface of the first rotor pole shoe 12. All in all, it is possible to adapt the torque characteristics in a widely varying manner to different uses by a suitable design of the air gap.

As an alternative, it is possible to replace the first permanent magnet 5 and/or the second permanent magnet 6 by excitation coils having soft-magnetic cores. This will provide an actuating device having a very large operating range.

Figure 6:
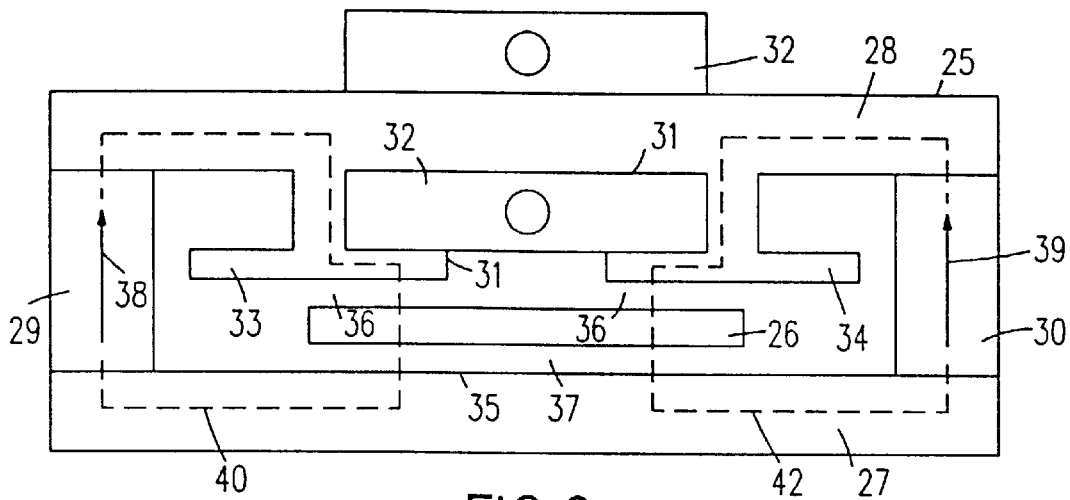
FIG. 6 shows an electromotive actuating device constructed as a linear actuator in a center position.

FIG. 6 shows an electromotive actuating device constructed as a linear actuator. The linear actuator comprises a stationary member 25 and a movable member in the form of an elongate plunger 26. The stationary member 25 has a first iron yoke 27 and a second iron yoke 28. The first iron yoke 27 and the second iron yoke 28 are connected to one another by means of a first permanent magnet 29 and a second permanent magnet 30. The second iron yoke 28 has a groove 31 in which an excitation coil 32 is arranged. The second iron yoke 28 has a first pole shoe 33 and a second pole shoe 34. The first iron yoke 27 has a third pole shoe 35. The first pole shoe 33 and the second pole shoe 34 are spaced from the plunger 26 by a first air gap 36. The third pole shoe 35 is spaced from the plunger 26 by an air gap 37. The first permanent magnet 29 generates a first magnetic flux 38 and the second permanent magnet 30 generates a second magnetic flux 29.

In the situation shown in FIG. 6 the plunger 26 is in a center position. There is no excitation current in the excitation coil 32. The magnetic flux 38 generated by the first permanent magnet 29 is essentially guided in a first magnetic circuit 40 and the magnetic flux 39 generated by the second permanent magnet 30 is essentially guided in a third magnetic circuit 42.

The first magnetic circuit 40 includes the first permanent magnet 29, the second iron yoke 28, the first pole shoe 33, the first air gap 36, the plunger 26, the second air gap 37, the third pole shoe 35 and the first iron yoke 27.

The third magnetic circuit 42 includes the second permanent magnet 30, the second iron yoke 28, the second pole shoe 34, the first air gap 36, the plunger 26, the second air gap 37, the third pole shoe 35 and the first iron yoke 27. In the center position shown in FIG. 6 neither the first magnetic flux 38 generated by the first permanent magnet 29 nor the second magnetic flux 39 generated by the second permanent magnet 30 are linked to the excitation coil 32.

Figure 7:
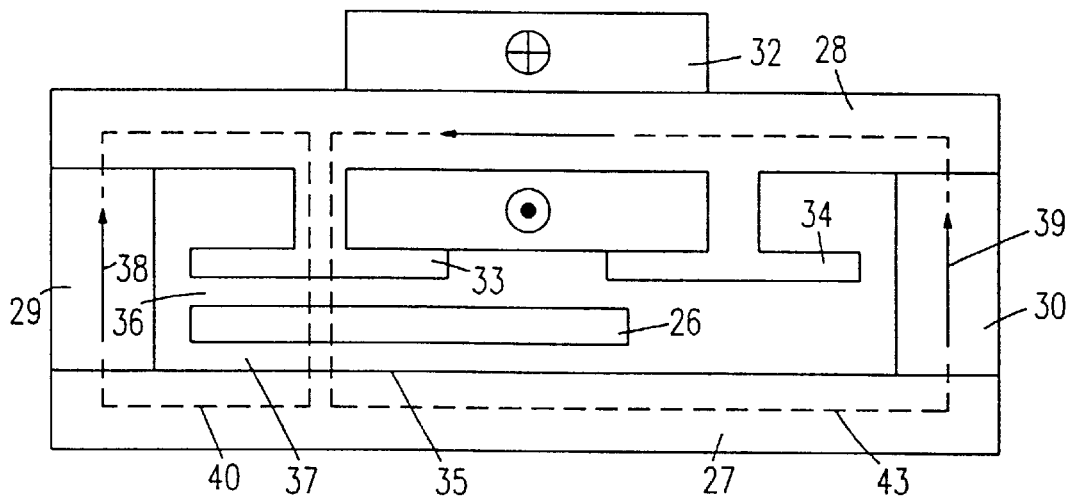
FIG. 7 shows the linear actuator of FIG. 6 in a first maximum position.

FIG. 7 shows the linear actuator of FIG. 6 in a first maximum position in which the plunger 26 has been moved to the left with respect to the center position shown in FIG. 6. In this first maximum position the plunger 26 is disposed in such a manner that a maximum overlap between the first pole shoe 33 and the plunger 26 is obtained. The first magnetic flux 38 generated by the first permanent magnet 29 is still guided in the first magnetic circuit 40. However, the second magnetic flux 39 generated by the second permanent magnet 30 is guided in a fourth magnetic circuit 43. The fourth magnetic circuit 43 includes the second permanent magnet 30, the second iron yoke 28, the excitation coil 32, the first pole shoe 33, the first air gap 36, the plunger 26, the second air gap 37, the third pole shoe 35 and the first iron yoke 27. In this first maximum position shown in FIG. 6 the first magnetic flux 38 is not linked to the excitation coil 32, while the second magnetic flux 39 links almost wholly to the excitation coil 32. The current in the excitation coil 32 has such a direction that the magnetic flux generated by the excitation coil 32 has the same direction as the second magnetic flux 39 generated by the second permanent magnet 30.

Figure 8:
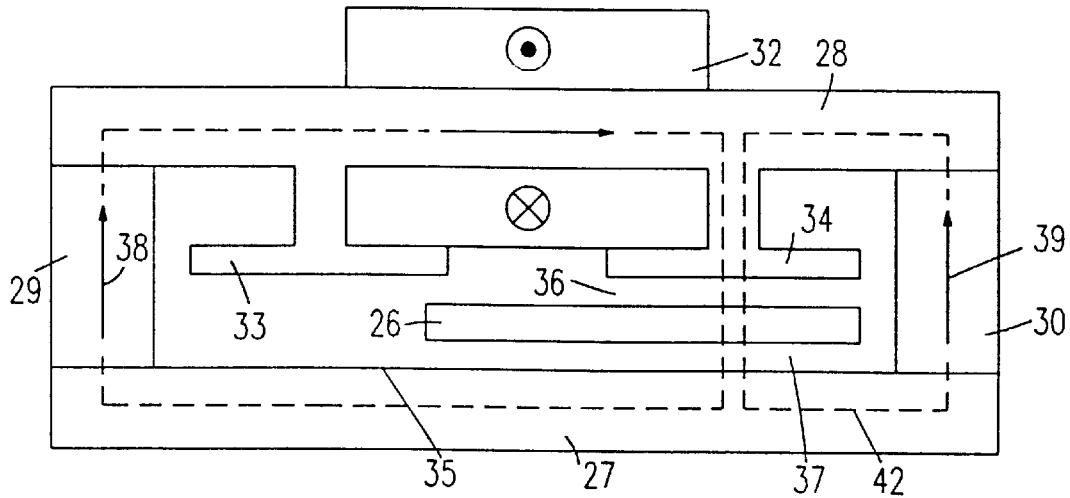
FIG. 8 shows the linear actuator of FIG. 6 in a second maximum position.

FIG. 8 shows the linear actuator in a second maximum position in which the plunger 26 has moved to the right with respect to the center position. The plunger 26 is disposed in such a manner that a maximum overlap between the plunger 26 and the second pole shoe 34 is obtained. The second magnetic flux 39 generated by the second permanent magnet 30 is essentially guided via the third magnetic circuit 42. The first magnetic flux 38 generated by the first permanent magnet 29 is guided via a second magnetic circuit 41. This second magnetic circuit 41 includes the first permanent magnet 29, the second iron yoke 28, the excitation coil 32, the second pole shoe 34, the first air gap 36, the plunger 26, the excitation coil 32, the second air gap 37, the third pole shoe 35 and the first iron yoke 27. Thus, the first magnetic flux 38 is linked almost wholly to the excitation coil 32, while the second magnetic flux 39 is linked practically not at all to the excitation coil 32. The current in the excitation coil 32 has such a direction that the magnetic flux generated by the excitation coil 32 has the same direction as the first magnetic flux 38 generated by the first permanent magnet 29.

Figure 9:
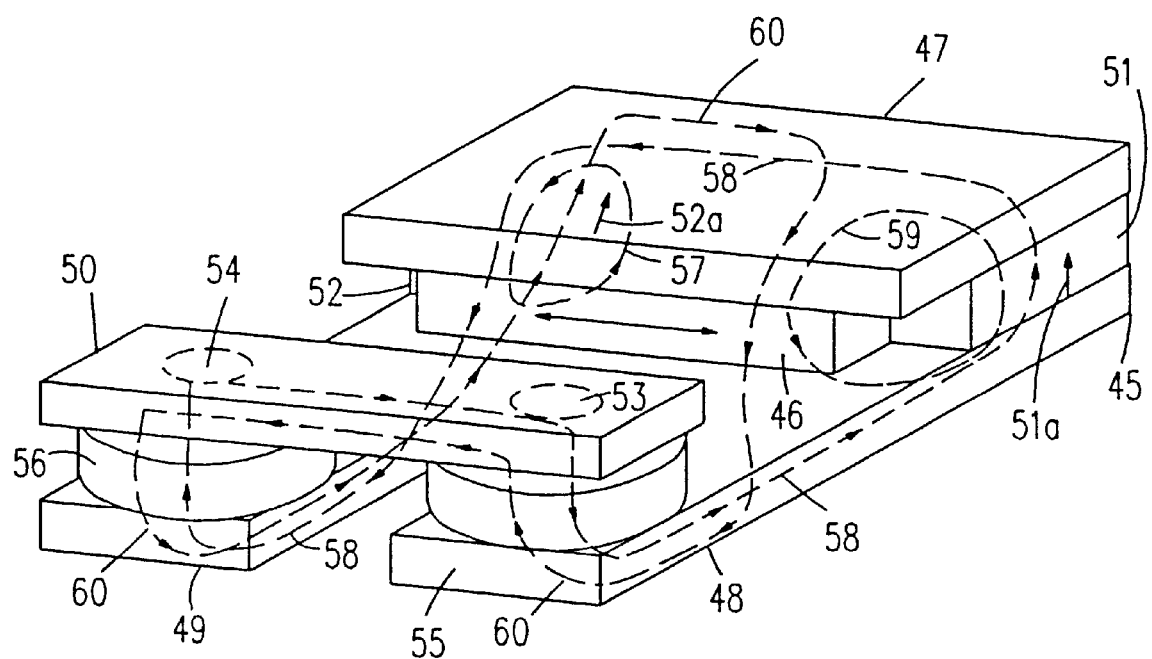
FIG. 9 shows a modification of the linear actuator of FIG. 6, the linear actuator being box-shaped so as to obtain a compact construction.

FIG. 9 shows a modification of the linear actuator of FIG. 6. The linear actuator shown in FIG. 9 is box-shaped in order to achieve a small volume. The linear actuator shown in FIG. 9 comprises a stationary member 45 and a movable member in the form of a plunger 46. The stationary member 45 comprises a first iron yoke 47, a second iron yoke 48, a third iron yoke 49 and a fourth iron yoke 50. The first iron yoke 47 is connected to the second iron yoke 48 by means of a first permanent magnet 51. The first permanent magnet 51 generates a constant magnetic flux 51a. The first iron yoke 47 is connected to the third iron yoke 49 by means of a second permanent magnet 52, which in Fig. 9 is covered by the first iron yoke 47 for a substantial part. The second permanent magnet 52 generates a constant magnetic flux 52a. The second iron yoke 48 and the fourth iron yoke 50 are connected by means of a cylindrical fifth iron yoke 53, which serves as a coil former for a first excitation coil 55. The third iron yoke is connected to the fourth iron yoke 50 by means of a cylindrical sixth iron yoke 54, which sixth iron yoke 43 serves as coil former for a second excitation coil 56. The operation of the linear actuator shown in FIG. 9 corresponds to the operation of the linear actuator described with reference to FIGS. 6 to 8. Accordingly, the actuator comprises a first magnetic circuit 57, a second magnetic circuit 58, a third magnetic circuit 59 and a fourth magnetic circuit 60. The first magnetic circuit 57 includes the first iron yoke 47, the plunger 46, the third iron yoke 49 and the second permanent magnet 52. The third magnetic circuit 59 includes the first iron yoke 47, the plunger 46, the second iron yoke 48 and the first permanent magnet 51. The second magnetic circuit 58 includes the first permanent magnet 51, the first iron yoke 47, the plunger 46, the third iron yoke 49, the sixth iron yoke 54 with the second excitation coil 56, the fourth iron yoke 50, the fifth iron yoke with the first excitation coil 55, and the second iron yoke 48. The fourth magnetic circuit 60 includes the second permanent magnet 52, the first iron yoke 47, the plunger 46, the second iron yoke 48, the fifth iron yoke 53 with the first excitation coil 55, the fourth iron yoke 50, the sixth iron yoke 545 with the second excitation coil 56, and the third iron yoke 49.

What is claimed is:

1. An electromotive actuating device comprising:
   a movable member;
   a stationary member including at least a first pole shoe, a second pole shoe and a third pole shoe;
   at least a first excitation part adapted to generate a constant magnetic flux;
   at least a second excitation part adapted to generate a magnetic flux of variable amplitude;
   at least a first and a second magnetic circuit being provided for guiding the magnetic flux generated by the first excitation part, the reluctance of the first and of the second magnetic circuit being controllable by means of the position of the movable member, and the second excitation part being included in the second magnetic circuit,
   wherein the first pole shoe and the third pole shoe form flux guiding elements of the first magnetic circuit, and the first pole shoe, the second pole shoe and the third pole shoe form flux guiding elements of the second magnetic circuit, and
   wherein a first width of an air gap formed between the movable member, and the first and the second pole shoe is different than a second width of the air gap between the stationary member and the third pole shoe.

2. An electromotive actuating device as claimed in claim 1, wherein the stationary member has a third excitation part adapted to generate a substantially constant magnetic flux, in that a third magnetic circuit and a fourth magnetic circuit have been provided for guiding the magnetic flux generated by the third excitation part, in that the second excitation part is included both in the second magnetic circuit and in the fourth magnetic circuit, in that the second pole shoe and the third pole shoe form flux guiding elements of the third magnetic circuit and the first pole shoe and the third pole shoe form flux guiding elements of the fourth magnetic circuit, and in that the third pole shoe is arranged between the first excitation part and the third excitation part.

3. An electromotive actuating device as claimed in claim 1, wherein the first excitation part comprises a permanent magnet.

4. An electromotive actuating device as claimed in claim 3, wherein the permanent magnet is a ferrite magnet.

5. A motor vehicle including an actuating device as claimed in claim 1.

6. A combustion engine having at least one conduit which includes a throttle valve for controlling a gas or fluid flow, characterized in that for actuating the throttle valve there has been provided an actuating device as claimed in claim 1.

7. An electromotive actuating device comprising:
   a movable member;
   a stationary member including at least a first pole shoe, a second pole shoe and a third pole shoe;
   at least a first excitation part adapted to generate a constant magnetic flux;
   at least a second excitation part adapted to generate a magnetic flux of variable amplitude;
   at least a first and a second magnetic circuit being provided for guiding the magnetic flux generated by the first excitation part, the reluctance of the first and of the second magnetic circuit being controllable by means of the position of the movable member, and the second excitation part being included in the second magnetic circuit,
   wherein the first pole shoe and the third pole shoe form flux guiding elements of the first magnetic circuit, and the first pole shoe, the second pole shoe and the third pole shoe form flux guiding elements of the second magnetic circuit, and
   wherein the actuating device takes the form of a rotary actuator and in that a circumferential angle of the third pole shoe is smaller than a circumferential angle of the first and the second pole shoe.

8. An electromotive actuating device as claimed in claim 7, wherein the stationary member has a third excitation part adapted to generate a substantially constant magnetic flux, in that a third magnetic circuit and a fourth magnetic circuit have been provided for guiding the magnetic flux generated by the third excitation part, in that the second excitation part is included both in the second magnetic circuit and in the fourth magnetic circuit, in that the second pole shoe and the third pole shoe form flux guiding elements of the third magnetic circuit and the first pole shoe and the third pole shoe form flux guiding elements of the fourth magnetic, and in that the third pole shoe is arranged between the first excitation part and the third excitation part.

9. An electromotive actuating device as claimed in claim 7, wherein the first excitation part comprises a permanent magnet.

10. An electromotive actuating device as claimed in claim 9, wherein a first width of an air gap formed between the movable member, and the first and the second pole shoe being different than a second width of the air gap between the stationary member and the third pole shoe.

11. An electromotive actuating device as claimed in claim 9, wherein the permanent magnet is a ferrite magnet.

12. An electromotive actuating device comprising:
    a movable member;
    a stationary member including at least a first pole shoe, a second pole shoe and a third pole shoe;
    at least a first excitation part adapted to generate a constant magnetic flux;
    at least a second excitation part adapted to generate a magnetic flux of variable amplitude;
    at least a first and a second magnetic circuit being provided for guiding the magnetic flux generated by the first excitation part, the reluctance of the first and of the second magnetic circuit being controllable by means of the position of the movable member, and the second excitation part being included in the second magnetic circuit,
    wherein the first pole shoe and the third pole shoe form flux guiding elements of the first magnetic circuit, and the first pole shoe, the second pole shoe and the third pole shoe form flux guiding elements of the second magnetic circuit, and
    wherein the electromotive actuating device takes the form of a linear actuator.

13. A door locking mechanism including an actuating device as claimed in claim 12.

14. An electromotive actuating device as claimed in claim 12, wherein the stationary member has a third excitation part adapted to generate a substantially constant magnetic flux, in that a third magnetic circuit and a fourth magnetic circuit have been provided for guiding the magnetic flux generated by the third excitation part, in that the second excitation part is included both in the second magnetic circuit and in the fourth magnetic circuit, in that the second pole shoe and the third pole shoe form flux guiding elements of the third magnetic circuit and the first pole shoe and the third pole shoe form flux guiding elements of the fourth magnetic, and in that the third pole shoe is arranged between the first excitation part and the third excitation part.

15. An electromotive actuating device as claimed in claim 12, wherein the first excitation part comprises a permanent magnet.

16. An electromotive actuating device as claimed in claim 15, wherein a first width of an air gap formed between the movable member, and the first and the second pole shoe being different than a second width of the air gap between the stationary member and the third pole shoe.

17. An electromotive actuating device as claimed in claim 15, wherein the permanent magnet is a ferrite magnet.

* * * * *